April 7, 1925.
B. F. BARKER
TYPEWRITING MACHINE
Filed March 14, 1922
1,532,115
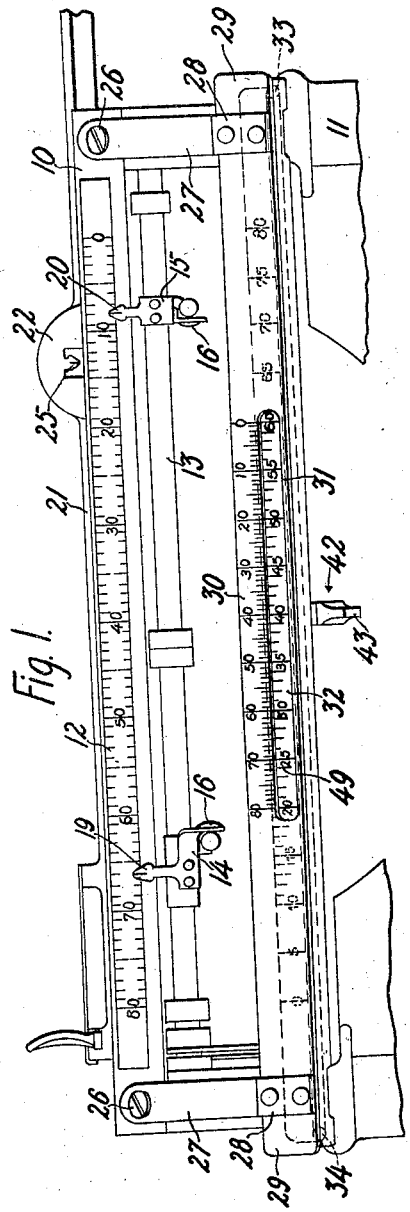
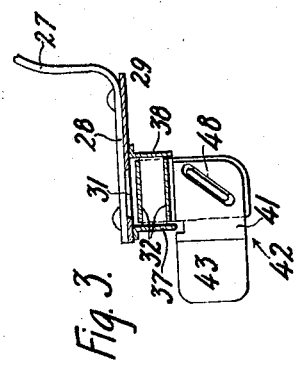
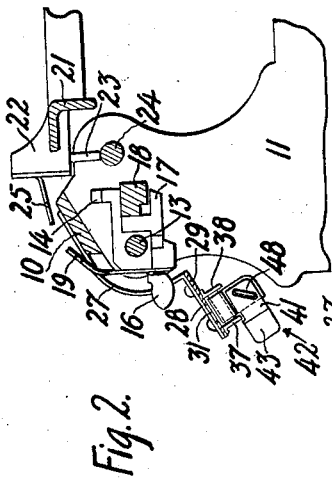
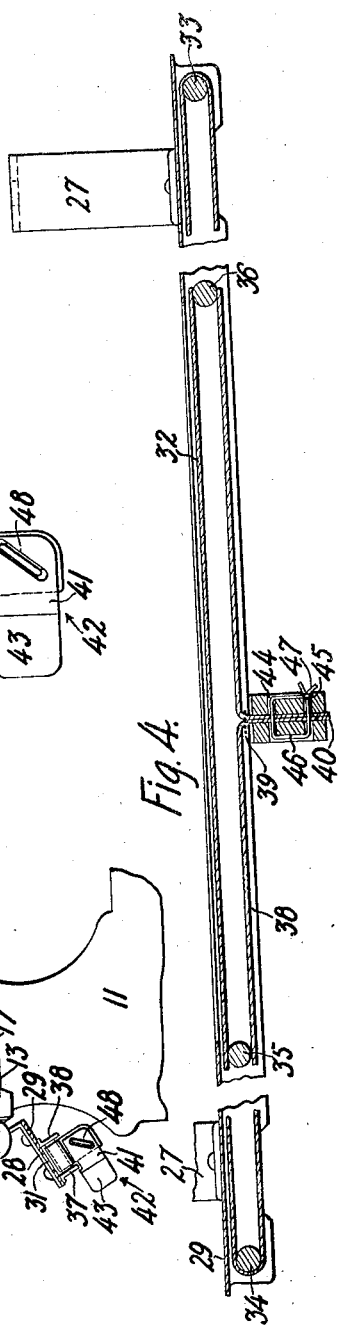
Inventor:
Benjamin F Barker
by B.C. Stickney
Attorney Patented Apr. 7, 1925.

1,532,115

UNITED STATES PATENT OFFICE.

BENJAMIN F. BARKER, OF EL PASO, TEXAS, ASSIGNOR TO UNDERWOOD TYPEWRITER COMPANY, OF NEW YORK, N. Y., A CORPORATION OF DELAWARE.

TYPEWRITING MACHINE.

Application filed March 14, 1922. Serial No. 543,636.

*To all whom it may concern:*

Be it known that I, BENJAMIN F. BARKER, a citizen of the United States, residing in El Paso, in the county of El Paso and State of Texas, have invented certain new and useful Improvements in Typewriting Machines, of which the following is a specification.

The present invention relates to computing devices for ascertaining the starting position, with reference to the letter-space scale of a typewriting machine, of a writing of given length to be centered between any selected margins, or in any selected column zones, denoted on such letter-space scale. More particularly, the invention relates to a device of this character of the general nature of a slide-rule whereby the desired computations may be made mechanically, and without mental effort, for any selected margins or column positions within the range of travel of the carriage of the typewriting machine.

An object of the present invention is the provision of a device of the character mentioned, having a fixed scale and a slide-scale of twice the length of the fixed scale, and having the scales so condensed that the scale on the slide may be laid in substantially a right line within the defines of the sides of the typewriter frame.

A further object of the invention is the provision of a slide-rule of the character mentioned, the slide of which is in the form of a continuous tape, of twice the length of the scale thereon, so that movement of the tape a distance of less than half its length will suffice to cause any graduation on the tape to register with any graduation on the fixed scale of the rule, and so that, to effect such movement, a finger-piece attached to the tape need not be passed around the bights thereof.

Further objects of the invention are the provision of means for mounting the device on a typewriting machine, in a clearly visible and accessible position, near and parallel to the usual letter-space scale of the machine, so that the graduations on the several scales may be conveniently read with respect to one another; of means whereby the device may be secured to the machine substantially within the defines of the sides of the machine frame; of a slide-rule of such construction that, when on the machine, any desired reading may be obtained therefrom by movement, in one direction along the front of the machine, of a finger-piece attached to the front of the tape, preferably centrally of the scale thereon; and of a setting for the tape to protect the same against injury.

A further object of the invention is the provision of a slide-rule of the character mentioned, which may readily, and in a simple manner, be attached to and detached from a typewriting machine, and which may be marketed as an article, unitary in itself, to be acquired and used, if wanted; and which, to be applied to the machine, requires no modification or special structure of the latter.

Other features and advantages will hereinafter appear.

In the accompanying drawings,

Figure 1 is a view of the front upper edge of the main frame of a typewriting machine, showing the usual letter-space scale thereon, and, in conjunction therewith, the computing device of the present invention; and showing the front edge of the carriage.

Figure 2 is a view in cross-section on the line 2—2 of Figure 1.

Figure 3 is an enlarged detail view, in end elevation, partially cross-sectional, of the computing device and means by which it is mounted on the machine-frame.

Figure 4 is a view in cross-section on the line 4—4 of Figure 3.

Fast to a cross-bar 10, forming part of the main frame 11 of the typewriting machine, is the usual letter-space scale 12. Adjustable on a rod 13, carried by the main frame 11, are margin-stops 14 and 15. These stops are of the kind usually found on the Underwood standard typewriting machine, and are released and moved by means of finger-pieces 16. As shown in Figure 2, the finger-piece 16 operates a pivoted toothed member 17, which forms part of the stop structure, and which engages with the toothed bar 18 for locking the stop in selected position. The details of the stop 15 are not shown. The stops 14 and 15 carry pointers or index-fingers 19 and 20, respectively, for co-operation with the scale 12, to determine the setting of the stops.

The front rail 21 of the carriage has a bracket 22 thereon, on which is mounted a roller 23 for supporting the front of the carriage on a cross-rod 24 on the main frame. The rod 24 serves as a runway for the carriage in its travel in letter-feed and return directions. Also carried by the bracket 22 on the carriage is the usual pointer or index-finger 25, to co-operate with the scale 12 on the main frame, for finding and indicating the position of the printing point on the platen (not shown).

Secured to the cross-bar 10 of the main frame, at either end thereof, by screws 26, are arms 27, which depend downward and forward, and which, at their lower ends, are offset at 28, to form brackets for supporting a flat plate 29, which extends horizontally across the front of the machine. Centrally of the plate 29, and on the upper edge thereof, is a scale 30, having graduations numbered in correspondence with the graduations on the scale 12, and, like the latter, running from right to left. The scale 30 is, however, much more condensed than the scale 12, being shown as of only one-half of the actual length of the latter. Below the scale 30 the plate 29 is cut away, as at 31, to display a portion of the slide-scale or tape 32, which lies behind the plate 29.

The sliding scale or tape 32 (see Figure 4) is in the form of a continuous band, the bights of which embrace, and are supported by, pins 33 and 34. Between the bights of the tape the front and rear reaches thereof are held apart by, and have bearing upon, similar pins 35 and 36. All of the pins 33 to 36 are carried by and between two angle-pieces 37 and 38, soldered or otherwise suitably secured to the under side of the plate 29, and running parallel to one another, lengthwise of the plate 29, so that the tape is set and moves in a channel formed by the plates 29, 37 and 38. The plates 37 and 38 are preferably of such depth as to protrude slightly beyond the lower reach of the tape, thereby protecting the tape against injury.

The ends of the tape are brought together, and may be stitched or otherwise connected as at 39. Beyond the point 39 the ends of the tape are turned outward, as shown in Figures 3 and 4. For gripping and moving the tape, the outturned ends 40 thereof are set in a slot 41 in the rear of a block 42, the front of which is tapered to form a handle-piece 43. For securing the tape ends 40 in the slot 41, the block has perforations 44 and 45 (see Figure 4), through which, and through the tape ends within the block, a string 46 is passed; the ends of the string being brought together and tied at 47. Preferably, to prevent the string from wear, the side faces of the block 42 are grooved, as at 48, between the perforations 44 and 45, so that the string 46, where it crosses the faces of the block, may lie, out of reach, in the grooves 48. The block 42 thus forms a handle which is attached to, and carried by, the tape. The angle-pieces 37 and 38 may, however, serve as a bearing for the handle-piece.

Referring to Figure 1, the front reach of the tape is shown as having a scale 49 thereon, the graduations of which run from left to right, that is to say, in a direction reverse to the graduations on the scales 30 and 12. In correspondence with the graduations on the scales 30 and 12, the graduations on the scale 49 run from "0" to "80". The graduations on the scale 49 are, however, twice the distance apart of the graduations on the scale 30. Thus, the scale 49 is just twice as long as the scale 30. It will be evident that, when one graduation on the scale 49 is opposite a graduation on the scale 30, other graduations on the scale 49 are opposite alternate graduations on the scale 30. Only that part of the scale 49 is required to be visible which lies opposite the scale 30, and so the slot 31 in the plate 29 is shown in Figure 1 as approximately the length of the scale 30. By moving the tape-handle-piece 43, however, any part of the scale 49 may be brought into registration with the scale 30; and it will be noted that the distance between the bights of the tape is sufficiently great to permit the handle 43 to be thrown, either to the right or left, far enough to bring any desired number on the tape into registration with any desired number on the scale 30. That portion of the tape which forms the rear reach thereof, when the handle 43 is centered, as shown in Figure 1, may therefore be blank.

As hereinbefore stated, the purpose of the rule is to ascertain the position on the scale of the typewriting machine of the initial character of a given reading to be centered between any given readings on the scale of the typewriting machine. The given readings on the scale of the typewriting machine may be the extreme margins, or any selected margins, as determined by the margin-stops, or may be any two readings at any positions between the margin-stops. To determine the position on the scale of the typewriting machine for the initial character of the writing to be thus centered, the tape is moved so as to bring the number thereon which corresponds to the starting margin opposite the number on the fixed scale 30 which corresponds to the other margin. For instance, if the writing is to be centered between readings "25" and "70" on the scale of the typewriting machine, the tape is moved until the reading "25" thereon registers with the reading "70" on the fixed scale 30, as shown in Figure 1. Thereafter the number of characters in the writing to be centered (including spaces between words) is added to the first margin-number. If, as in the instance given, the first margin-number is "25" and the total number of characters, including spaces between words, is eleven, the sum will be thirty-six. The sum is then read off on the fixed scale 30, and a reading is taken on the tape opposite such reading on the fixed scale. On reading, for example, the sum "36" off on the fixed scale 30, it will be found that the number on the tape registering therewith is "42," if the tape has been set in the manner indicated. This number on the tape indicates the graduation on the scale of the typewriting machine at which the carriage-pointer should be set for printing the initial character of the writing. If the reading representing the sum measured on the fixed scale falls between two graduations on the tape, the higher of these tape-graduations is the one selected for the initial character. In practice, the number of characters in a given writing to be centered and the addition thereto of the first margin-number is obtained, without mental effort, by merely throwing the typewriter-carriage to the marginal position, which may be determined by the right-hand margin-stop, and striking the space-bar once for each character and space between words. This reading is then taken from the scale of the typewriting machine, and the corresponding number read on the fixed scale of the rule to get the reading on the tape for the position to which the typewriter-carriage must then be moved for printing the initial character of the matter to be written.

Whether or not "0" is one of the selected margins, the operation is the same. Let us assume, for instance, that the margins selected are "0" and "80." If matter occupying thirty letter-spaces is to be centered between margins "0" and "80," the number "30" is read off on the fixed scale 30. In such case, it will be noted that the number "30" on the scale 30 registers with the number "25" on the tape. "25" is therefore the graduation of the typewriter-scale at which the carriage-pointer should be set for writing the initial character of matter occupying thirty letter-spaces to be centered between "0" and "80."

The principle of computation involved is simple and is as follows. In the first example above given, the margin-stops were "25" and "70." This means that there are forty-five letter-spaces within which the writing is to be centered. A single character to be centered between "25" and "70" will therefore be set at one-half of forty-five, or at either twenty-two or twenty-three, letter-spaces beyond the starting margin "25," that is to say will be set at the graduation "47" or "48." Where, however, there are a number of characters in the writing (in the example given there are eleven), half of these must fall on each side of the center position "47" or "48." One-half of eleven is five and one-half, and five and one-half subtracted from "47½" gives a reading "42." The reading "42" has been shown by the rule to be the proper reading on the typewriter-scale for the initial character. Obviously the point midway between "25" and "70" may be determined by taking half the sum of these numbers.

If the scales in Figure 1 be measured as to length, it will be noted that the scale 30 is just one-half of the length of the scale 12, and that the scale 49 and the scale 12 are of the same length. So far as effecting any required computation is concerned, it is not necessary that the scales of the computing device have any such relations in length to the length of the fixed scale 12 on the typewriting machine. The scale 30 may be of any desired length, provided it has graduations equal in number to the graduations on the scale 12. The scale 49 on the tape must, however, be twice as long as the scale 30, and, if the scale 30 is more than half as long as the scale 12, the support of the scale 49 might have to be extended beyond the side members of the typewriter-frame. It is, therefore, convenient to make the scale 49 of the same length as the scale 12, in which event the scale 30 will, of course, be half that length, as shown in Figure 1.

It will be noted that, upon removal of the screws 26, the bracket-arms 27 and the computing device may be removed as a unit when desired. It will also be noted that the computing device and its connections are attachable to the frame of the machine without modification of the latter, and that the attachment is so simple and convenient that the device may be marketed independently of the machine, to be bought and attached to the machine if desired.

Variations may be resorted to within the scope of the invention, and portions of the improvements may be used without others.

Having thus described my invention, I claim:

1. A slide-device for ascertaining the scale position on a typewriting machine of the initial character of any writing to be centered between any given readings on the scale of the typewriting machine, having in fixed position thereon a scale, the graduations of which are numbered as on the letter-space scale of the typewriting machine, and the slide of which is a continuous tape having a front and a rear reach, the front reach of which bears a scale, the graduations of which are similarly numbered, but in the reverse direction, and are at letterspace distances apart and at twice the distance apart of the graduations on the fixed scale.

2. A slide-device for ascertaining the scale position on a typewriting machine of the initial character of any writing to be centered between any given readings on the scale of the typewriting machine, having in fixed position thereon a miniature scale, the graduations of which are numbered as on the letter-space scale of the typewriting machine; and the slide of which is a continuous tape bearing a scale, the graduations of which are similarly numbered, but in the reverse direction, and are at twice the distance apart of the graduations on the fixed miniature scale, and a handle on the rear reach of the tape for sliding the same, the handle being carried by the ends of the tape beyond their point of attachment to one another, and the front and rear reaches of the tape being each more than twice the length of the fixed miniature scale, so that any desired graduation of the tape scale may be brought into coincidence with any desired graduation of the fixed miniature scale without moving said handle out of the rear reach.

3. A slide-device for ascertaining the scale position on a typewriting machine of the initial character of any writing to be centered between any given readings on the scale of the typewriting machine, having in fixed position thereon a scale, the graduations of which are numbered as on the letter-space scale of the typewriting machine, and the slide of which is a continuous tape bearing a scale, the graduations of which are similarly numbered, but in the reverse direction, and are at twice the distance apart of the graduations on the fixed scale, and a handle on the tape for sliding the same, the handle being a block having a slot in which are secured the ends of the tape beyond their point of attachment to one another.

4. A slide-device for ascertaining the scale position on a typewriting machine of the initial character of any writing to be centered between any given readings on the scale of the typewriting machine, having in fixed position thereon a miniature scale, the graduations of which are numbered as, but at less distance apart than, on the letter-space scale of the typewriting machine, and the slide of which is a continuous tape bearing a scale, the graduations of which are similarly numbered, but in the reverse direction, and are at twice the distance apart of the graduations on the fixed miniature scale.

5. In a typewriting machine having a letter-space scale, a slide-device for ascertaining the letter-space scale position of the initial character of any writing to be centered between any given readings on said letter-space scale, having in fixed position thereon a miniature scale, graduations of which are numbered as, but at less distance apart than, upon the letter-space scale, and the slide of which is a continuous band bearing a scale, the graduations of which are similarly numbered but in the reverse direction and are at twice the distance apart of the graduations on the miniature scale, and a shield concealing all of the band scale except the portion which is in register with the miniature scale.

6. A slide-device for ascertaining the scale position on a typewriting machine of the initial character of any writing to be centered between any given readings on the scale of the typewriting machine, comprising a plate, having in fixed position thereon a scale, the graduations of which are numbered as on the letter-space scale of the typewriting machine, and the slide of which is a continuous tape behind said plate but showing in part through an opening in the plate, and bearing a scale, the graduations of which tape-scale are similarly numbered, but in the reverse direction, and are at twice the distance apart of the graduations on the fixed scale.

7. A slide-device for ascertaining the scale position on a typewriting machine of the initial character of any writing to be centered between any given readings on the scale of the typewriting machine, comprising a plate, having in fixed position thereon a scale, the graduations of which are numbered as on the letter-space scale of the typewriting machine, and the slide of which is a continuous tape, behind said plate but showing in part through an opening in the plate, which is somewhat greater in length than the fixed scale on the plate, and bearing a scale, the graduations of which tape-scale are similarly numbered, but in the reverse direction, and are at twice the distance apart of the graduations on the fixed scale.

8. A slide-device for ascertaining the scale position on a typewriting machine of the initial character of any writing to be centered between any given readings on the scale of the typewriting machine, comprising a plate, having in fixed position thereon a scale, the graduations of which are numbered as on the letter-space scale of the typewriting machine, and the slide of which is a continuous tape, behind said plate but showing in part through an opening in the plate, which is somewhat greater in length than the fixed scale on the plate, and bearing a scale, the graduations of which tape-scale are similarly numbered, but in the reverse direction, and are at twice the distance apart of the graduations on the fixed scale, the plate being of a length to over-reach the entire tape-scale, and the fixed scale being located centrally of the plate.

9. A slide-device for ascertaining the scale position on a typewriting machine of the initial character of any writing to be centered between any given readings on the scale of the typewriting machine, comprising a plate, having in fixed position thereon a scale, the graduations of which are numbered as on the letter-space scale of the typewriting machine, and the slide of which is a continuous tape, behind said plate but showing in part through an opening in the plate, which is somewhat greater in length than the fixed scale on the plate, and bearing a scale, the graduations of which tape-scale are similarly numbered, but in the reverse direction, and are at twice the distance apart of the graduations on the fixed scale, the plate being of a length to over-reach the entire tape-scale, and the fixed scale being located centrally of the plate, and a handle on the tape located centrally of the tape-scale, whereby the tape may be moved to bring any selected graduation thereon into registration with any selected graduation on the plate-scale.

10. A slide-rule for ascertaining the scale position on a typewriting machine of the initial character of any writing to be centered between any given readings on the scale of the typewriting machine, comprising a plate, having in fixed central position thereon a scale, the graduations of which are numbered as on the letter-space scale of the typewriting machine, said plate also having an opening adjacent the fixed scale and approximately of the same length, and the slide of which is a continuous tape exposed through said opening and greater in length than the fixed scale on the plate, said tape bearing a scale, the graduations of which are similarly numbered, but in the reverse direction, and are at twice the distance apart of the graduations on the fixed scale, the plate being of a length to overreach the entire tape-scale, and a handle on the tape located centrally of the tape-scale, so that the tape may be moved to bring any selected graduation thereon into registration with any selected graduation on the plate-scale without moving the handle more than half the length of the scale on the tape.

11. A slide-device for ascertaining the scale position on a typewriting machine of the initial character of any writing to be centered between any given readings on the scale of the typewriting machine, comprising a plate, having in fixed position thereon a scale, the graduations of which are numbered as on the letter-space scale of the typewriting machine, and the slide of which is a continuous tape bearing a scale, the graduations of which are similarly numbered, but in the reverse direction, and are at twice the distance apart of the graduations on the fixed scale, said plate having a channel, formed on the rear side of the plate, to receive the entire tape-slide, and an opening adjacent the fixed scale to expose a portion of the scale on the tape.

12. A slide-device for ascertaining the scale position on a typewriting machine of the initial character of any writing to be centered between any given reading on the scale of the typewriting machine, comprising a plate, having in fixed position thereon a scale, the graduations of which are numbered as on the letter-space scale of the typewriting machine, a slide in the form of a continuous tape bearing a scale, the graduations of which are similarly numbered, but in the reverse direction, and are at twice the distance apart of the graduations on the fixed scale, brackets on the side of the plate opposite the fixed scale and pins on the brackets for supporting the tape, said plate having an opening adjacent the fixed scale to permit the fixed scale and the scale on the tape to be viewed concomitantly.

13. In a typewriting machine, a letter-space scale on the fixed frame thereof, a carriage having a pointer or indexed-piece to register with the graduations on said scale, brackets, depending forward and downward from the scale-support, on the fixed frame, a plate supported by the brackets parallel to said scale and having thereon another scale, the graduations of which are numbered similarly and in the same direction as the graduations on the first-mentioned scale, and a slide-scale mounted on said plate, co-operating with the fixed scale thereon, and bearing graduations which are similarly numbered, but in the reverse direction, and are at twice the distance apart of the graduations on the fixed scale on said plate.

14. In a typewriting machine, a letter-space scale on the fixed frame thereof, a carriage having a pointer or index-piece to register with the graduations on said scale, brackets on the fixed frame, a plate supported by the brackets parallel to said scale and having thereon another scale, centered and condensed with respect to the first-mentioned scale, and the graduations of which are numbered similarly and in the same direction as the graduations on the first-mentioned scale, and a slide-scale mounted on said plate, co-operating with the fixed scale thereon, and bearing graduations which are similarly numbered, but in the reverse direction, and are at twice the distance apart of the graduations on the fixed scale on said plate.

15. In a typewriting machine, a letter-space scale on the fixed frame thereof, a carriage having a pointer or index-piece to register with the graduations on said scale, brackets on the fixed frame, a plate supported by the brackets parallel to said scale and having thereon another scale, the graduations of which are numbered similarly and in the same direction as the graduations on the first-mentioned scale, brackets on said plate, and a continuous, slidable tape carried by the brackets on the plate, the tape bearing a scale, the graduations of which are similarly numbered, but in the reverse direction, and are at twice the distance apart of the graduations on the fixed scale on said plate.

16. In a typewriting machine, a letter-space scale on the fixed frame thereof, a carriage having a pointer or index-piece to register with the graduations on said scale, brackets on the fixed frame, a plate supported by the brackets parallel to said scale and having thereon another scale, the graduations of which are numbered similarly and in the same direction as the graduations on the first-mentioned scale, brackets on the rear of said plate, and a continuous, slidable tape carried by the brackets on the plate, the tape bearing a scale, the graduations of which are similarly numbered, but in the reverse direction, and are at twice the distance apart of the graduations on the fixed scale on said plate, the plate having an elongated opening therein of the length of and opposite the fixed scale thereon, through which opening any selected portion of the tape-scale may show.

17. In a typewriting machine, a letter-space scale on the fixed frame thereof, a carriage having a pointer or index-piece to register with the graduations on said scale, brackets on the fixed frame, a plate supported by the brackets parallel to said scale and having thereon another scale, the graduations of which are numbered similarly and in the same direction as the graduations on the first-mentioned scale, bracketed on the rear of said plate, and a continuous, slidable tape carried by the brackets on the plate, the tape bearing a scale, the graduations of which are similarly numbered, but in the reverse direction, and are at twice the distance apart of the graduations on the fixed scale on said plate, the plate having an elongated opening therein of the length of and opposite the fixed scale thereon, through which opening any selected portion of the tape-scale may show; the fixed scale being centered and condensed with respect to the first-mentioned scale on the machine-frame, so that the plate may overreach the entire scale on the tape within the limits of the sides of the machine-frame.

18. In a typewriting machine, a letter-space scale on the fixed frame thereof, a carriage having a pointer or index-piece to register with the graduations on said scale, brackets on the fixed frame, a plate supported by the brackets parallel to said scale and having thereon another scale, the graduations of which are numbered similarly and in the same direction as the graduations on the first-mentioned scale, brackets on the rear of said plate, a continuous, slidable tape carried by the brackets on the plate, the tape bearing a scale, the graduations of which are similarly numbered, but in the reverse direction, and are at twice the distance apart of the graduations on the fixed scale on said plate, the plate having an elongated opening therein of the length of and opposite the fixed scale thereon, through which opening any selected portion of the tape-scale may show; the fixed scale being centered and condensed with respect to the first-mentioned scale on the machine-frame, so that the plate may overreach the entire scale on the tape within the limits of the sides of the machine-frame, and a handle centered with respect to the scale on the tape for sliding the latter to bring any selected graduation thereon into registration with any graduation on the fixed scale on the plate by a one-way movement of the handle within the limits of the machine-frame.

19. In a typewriting machine, a frame, a carriage having a central pointer and mounted on said frame for traveling movement, a letter-space scale at the top and front of said frame to cooperate with said pointer in indicating the letter-space position of the carriage, and a device secured to the front of the frame for determining the initial setting of the carriage relative to said letter-space scale, in order to type a heading or the like in centered position between two predetermined marginal limits.

BENJAMIN F. BARKER.

Witnesses:
HARRY BARNETT,
C. MANSON.